(12) United States Patent
Bostick et al.

(10) Patent No.: US 10,034,083 B2
(45) Date of Patent: Jul. 24, 2018

(54) CROWDSOURCING SOUND CAPTURES TO DETERMINE SOUND ORIGINS AND TO PREDICT EVENTS

(71) Applicant: International Business Machines Corporation, Armonk, NY (US)

(72) Inventors: James E. Bostick, Cedar Park, TX (US); John M. Ganci, Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 15/260,536

(22) Filed: Sep. 21, 2016

(65) Prior Publication Data

US 2018/0084338 A1    Mar. 22, 2018

(51) Int. Cl.
 G06F 3/16      (2006.01)
 H04R 1/40      (2006.01)
 H04R 3/00      (2006.01)
 H04W 88/02     (2009.01)

(52) U.S. Cl.
 CPC ............. *H04R 1/406* (2013.01); *H04R 3/005* (2013.01); *H04W 88/02* (2013.01)

(58) Field of Classification Search
 None
 See application file for complete search history.

(56) References Cited

U.S. PATENT DOCUMENTS 8,781,494 B2   7/2014  Kuehnel
9,129,602 B1*  9/2015  Shepard ............... G10L 21/013
9,245,041 B2*  1/2016  Pilskalns ............. G06F 17/3087
9,288,594 B1*  3/2016  Polansky ................ G10L 19/00
9,769,434 B1*  9/2017  Smallwood ............ H04N 7/185

(Continued)

FOREIGN PATENT DOCUMENTS

WO   2013049323 A1   4/2013
WO   2013059691 A1   4/2013

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Peter Vincent Agustin
(74) *Attorney, Agent, or Firm* — Law Office of Jim Boice

(57) ABSTRACT

One or more processors identify multiple mobile devices for crowdsourcing a sound capturing activity. The processor(s) receive sounds captured by the multiple mobile devices, and analyze the captured sounds to determine a location of a source of the sounds. The processor(s) identify a date and time that the source produced the sounds, and then identify a temporospatial sound pattern for the sounds based on the location of the source of the sounds and the date and time that the source produced the sounds. The processor(s) plot the temporospatial sound pattern on a digital map that depicts the location of the source of the sounds while the source produced the sounds. The processor(s) predict a recurrence of the sounds generated by the source based on the temporospatial sound pattern plotted on the map, and then modify a hardware system based on the predicted recurrence of the sounds generated by the source.

20 Claims, 8 Drawing Sheets

(56) References Cited

U.S. PATENT DOCUMENTS

| | | | |
|---|---|---|---|
| 9,794,719 B2* | 10/2017 | Chandran | H04S 7/301 |
| 2010/0174622 A1 | 7/2010 | Sohn et al. | |
| 2011/0039522 A1* | 2/2011 | Partridge | G01S 19/45 |
| | | | 455/414.1 |
| 2013/0084882 A1* | 4/2013 | Khorashadi | H04L 67/22 |
| | | | 455/456.1 |
| 2014/0052738 A1 | 2/2014 | Connell-Giammatteo et al. | |
| 2014/0136981 A1* | 5/2014 | Xiang | H04R 3/005 |
| | | | 715/728 |
| 2014/0372160 A1 | 12/2014 | Nath et al. | |
| 2015/0365455 A1* | 12/2015 | Choi | H04W 4/02 |
| | | | 709/219 |
| 2016/0066117 A1* | 3/2016 | Chen | H04R 3/005 |
| | | | 381/26 |
| 2016/0366517 A1* | 12/2016 | Chandran | H04S 7/301 |
| 2017/0064515 A1* | 3/2017 | Heikkila | H04W 4/043 |
| 2017/0075646 A1* | 3/2017 | Bostick | G06F 3/165 |
| 2017/0142498 A1* | 5/2017 | Blong | H04N 21/8106 |

OTHER PUBLICATIONS

U.S. Appl. No. 14/855,579, filed Sep. 16, 2015.

Anonymous, "Sound Intensity". The Engineering Toolbox, www.engineeringtoolbox.com.web. Aug. 11, 2016. <http://www.engineeringtoolbox.com/sound-intensity-d_712.html>.

Anonymous, "Noise Pollution Maps Crowdsourced from Smartphone Data." Emerging Technology from the ArXiv, MIT Technology Review. Oct. 22, 2013. Web. Aug. 11, 2016. <https://www.technologyreview.com/s/520606/noise-pollution-maps-crowdsourced-from-smartphone-data/>.

Anonymous, "Targeted Sound Discrimination in Audio Recordings". IPCOM00210034D, ip.com. Aug. 22, 2011.

Anonymous, "System and Method for Leveraging Metadata to Optimize Sound Output". IPCOM000226637D, ip.com. Apr. 21, 2013.

* cited by examiner

CROWDSOURCING SOUND CAPTURES TO DETERMINE SOUND ORIGINS AND TO PREDICT EVENTS

BACKGROUND

The present disclosure relates to the field of hardware devices, and particularly to hardware devices that capture sounds. Still more particularly, the present disclosure relates to hardware devices that determine the physical origin of sounds for use in predicting events, and then controlling hardware devices in response to the prediction of the event.

SUMMARY

A method, system, and/or computer program product modify a hardware system based on sounds captured by crowdsourcing. One or more processors identify multiple mobile devices for crowdsourcing a sound capturing activity. The processor(s) receive sounds captured by the multiple mobile devices, and analyze the captured sounds to determine a location of a source of the sounds. The processor(s) identify a date and time that the source produced the sounds, and then identify a temporospatial sound pattern for the sounds based on the location of the source of the sounds and the date and time that the source produced the sounds. The processor(s) plot the temporospatial sound pattern on a digital map that depicts the location of the source of the sounds while the source produced the sounds. The processor(s) predict a recurrence of the sounds generated by the source based on the temporospatial sound pattern plotted on the map, and then modify a hardware system based on the predicted recurrence of the sounds generated by the source.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION

Figure 1:
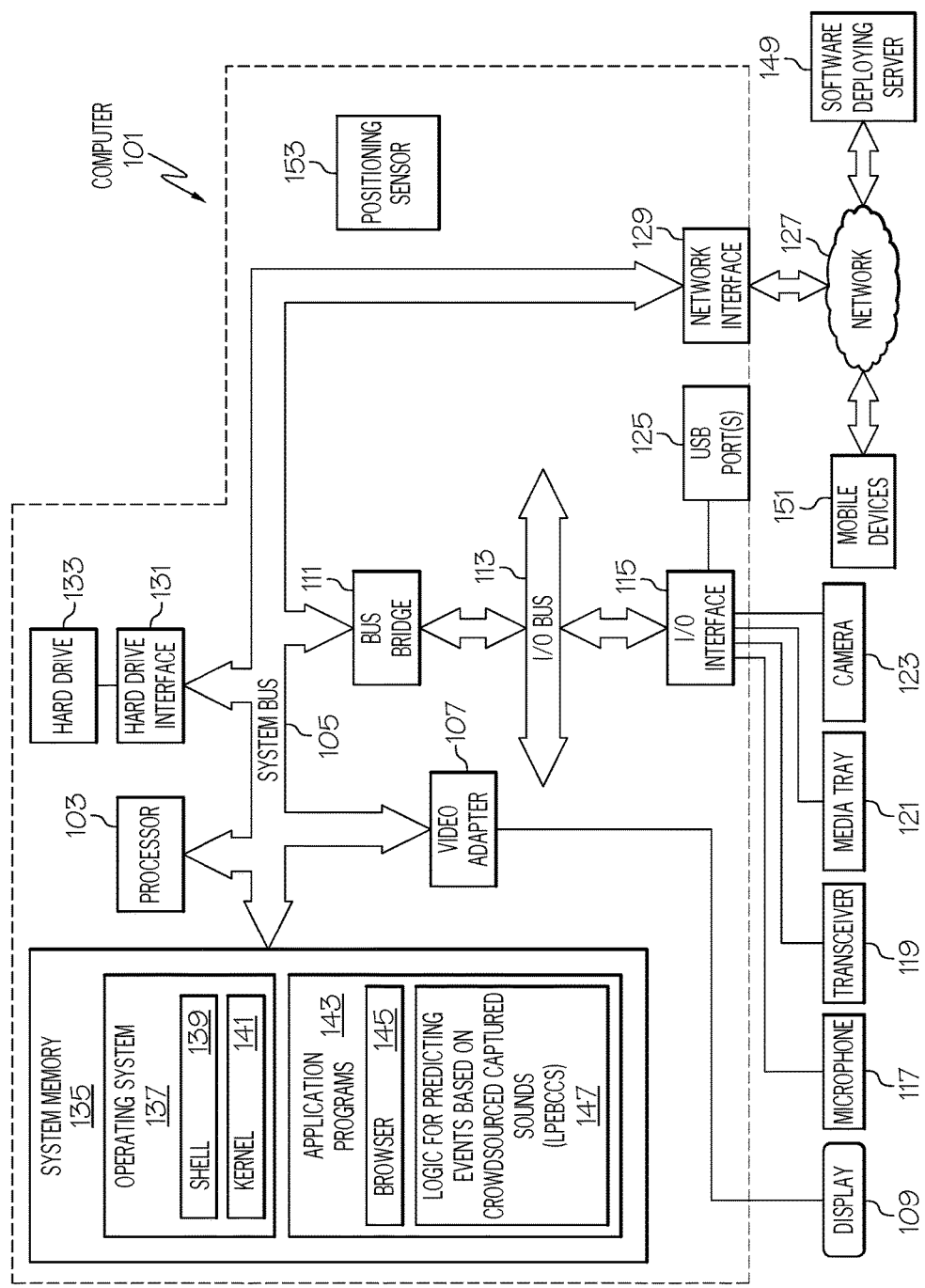
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or mobile devices 151 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a microphone 117 (capable of detecting sounds produced by a source), a transceiver 119 (capable of directly transmitting and receiving wireless signals to transceivers in other devices, such as mobile devices 151), a media tray 121 (which may include storage devices such as CD-ROM drives, multi-media interfaces, etc.), a camera 123 (capable of capturing still and moving digital images of objects), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., mobile devices 151) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Predicting Events Based on Crowdsourced Captured Sounds (LPEDBCCS) 147. LPEDBCCS 147 includes code for implementing the processes described below, including those described in FIGS. 2-6. In one embodiment, computer 101 is able to download LPEDBCCS 147 from software deploying server 149, including in an on-demand basis, wherein the code in LPEDBCCS 147 is not downloaded until needed for execution. In one embodiment of the present invention, software deploying server 149 performs all of the functions associated with the present invention (including execution of LPEDBCCS 147), thus freeing computer 101 from having to use its own internal computing resources to execute LPEDBCCS 147.

Also within the computer 101 is a positioning sensor 153. In one or more embodiments (particularly where some or all of the architecture of computer 101 is adopted by mobile devices 151), positioning sensor 153 may be a global positioning system (GPS) sensor that receives positioning signals from an array of orbital satellites, which provide positioning information to the GPS system.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Many times when a person hears a sound, he/she will try to determine from where the sound originated. The intensity and loudness of the sound is used as means to guess the possible source (i.e., the entity that produced the sound, such as a bird producing a bird song) and location (e.g., a particular tree in which the bird is perched) from which the sound emanated. In some cases it is not possible to identify the exact locations from which the sound originated. Sound intensity (decibel level) or even an absence of sound can be used as a key indicator to predict other events or optimal occurrences. Historical data analysis on events can be used to correlate such sounds or lack of sound as an indicator/predictor of a future event.

Examples of events that can be predicted based on previous sound patterns include, but are not limited to:

Traffic patterns—where an absence of noise or presence of sounds at a specific decibel level can be used as an indicator of a current, and thus future, traffic state;

Sporting event concession—where the captured sounds indicate fans cheering, which may be used as a predictive indicator of a food and beverage sales increase;

Nature watching occurrence—where the captured sounds are used to predict the presence of a certain type of animal (e.g., a mourning dove) at a particular time and location based on historical sound data; and Sporting activity conditions—where the sound of captured sounds (e.g., a pounding surf) can be used to indicate optimal or poor conditions for certain sports (e.g., surfing, fishing, swimming, etc.) in the near future.

Thus, the present invention provides a method for crowdsourced sound capture and analysis to determine sound location origin, and to be able to search the location on an electronic map in order to predict events and optimal occurrences of entities that are emitting certain sounds. That is, one or more embodiments of the present invention provides a method, system, and/or computer program product for capturing sound intensity, decibel levels, and sound direction from crowdsourced mobile devices (e.g., mobile devices 151 shown in FIG. 1). The sound data and location are streamed to remote server(s) (e.g., computer 101 shown in FIG. 1) to perform an analysis to determine the location of the sound's source/origin. The sound's origin and sound data are plotted on an electronic map to visualize the sound data for a given location, date and time.

The presently described system performs an historical analysis of sounds gathered by the remote server from the mobile devices to categorize captured sounds, to look for patterns in the sound, to correlate the captured sounds with other events and occurrences, and to predict a future event based on the categorization, pattern, and correlation.

One or more embodiments of the present invention provide a user with the ability to search locations on the electronic map to: 1) predict events (e.g., future traffic conditions, crowd assemblies, pedestrian traffic, safety/security hazards, etc.); and 2) predict optimal locations, dates and times of an occurrence (or recurrence) of sounds (e.g., sounds produced by a particular animal at a particular place and time) based on historical data collection and analysis.

The present invention utilizes multiple mobile devices (e.g., mobile devices 151 shown in FIG. 1); microphones (e.g., microphone 117 shown in FIG. 1 when incorporated into the architecture of the mobile devices 151 shown in FIG. 1) that are capable of capturing sound data (sound, location decibel) and direction (when incorporated with computer 101) in a crowdsourcing configuration, such that the sound data is streamed to the remote cognitive system (e.g., computer 101 shown in FIG. 1), wherein the remote cognitive system is able to determine and plot the location of a source of captured sound data on an electronic map (e.g., displayed on display 109 shown in FIG. 1) and to predict other events at this location, as well as optimal location times (temporospatial) occurrences/recurrences of a particular type of sound.

The following steps describe an overview of the implementation steps of one or more embodiments of the present invention. The numbering (e.g., Step 0, Step 1, etc.) should not be construed as describing an exact order in which the steps must be performed.

Step 0: System Preconfiguration

Users register their mobile devices with a remote system, such that the remote system identifies these mobile devices as being available for sound crowdsourcing captures. For example, consider FIG. 2, which depicts multiple mobile devices 251 (analogous to the mobile devices 151 shown in FIG. 1) positioned in various physical locations. In one or more embodiments, mobile devices 151 are cellular phones that are modified to continuously and passively listen for sounds, which are captured from mobile device microphones (e.g., microphone 117 shown in FIG. 1 when incorporated into the architecture of the cellular phones), converted into digital audio files, and streamed in real time (or alternatively are stored and periodically burst-streamed) to a remote cognitive server (e.g., computer 201, which is analogous to computer 101 shown in FIG. 1).

In one or more embodiments, the mobile devices 251 communicate with each other, in order to: 1) locate certain sounds (i.e., compare the relative intensity and temporal differences of a particular sound being captured by the various mobile devices 251 in order to triangulate the location of the source of that particular sound); and/or 2) provide peer-to-peer suggestions and/or directions to turn specific mobile devices on and off, depending on the location of the specific mobile devices (e.g., direct a mobile device that is physically closest to the source of the particular sound to turn on its microphone, in order to capture the cleanest copy of the sound).

In one or more embodiments of the present invention, the system (e.g., computer 201 plus the mobile devices 251) is configured to determine the accuracy level of the sound origin (i.e., where the producer of the sound is located). For example, a threshold of 90% confidence level will indicate that the determined/detected sound location is accurate, and thus there will be no annotation on a digital map that depicts where the sound source/origin is located (see FIG. 3). If the sound origin does not have enough data points (i.e., only a few mobile devices 251 have "heard" the sound), then the sound original (i.e., location of where the sound originates) is extrapolated from a knowledge base. For example, if a particular mobile device "thinks" that it heard a particular sound (i.e., is 50% confident that the sound was correctly identified and located), then a history of other captures of this particular sound at the location and/or time identified by that particular mobile device is retrieved in order to confirm or disprove that the particular mobile device has correctly identified the particular sound.

Step 1: Capture Sound Data using Crowdsourcing Passive Listening Mobile Devices

Multiple non-co-located passive listening mobile device microphones within a physical region (surrounding) receive sound from the surrounding region, and identify local properties of the local sound (i.e., intensity, decibel level, direction, etc.). The location, date and time data are also captured with the sound data. Thereafter, each mobile device in the surrounding region captures (stores and/or streams to the computer 201 shown in FIG. 2) the sound and calculates the local properties of the received sound such as the local intensity, loudness (i.e., decibel) and direction of the sound.

Referring again to FIG. 2, a source of sound (sound source 200) is within a region within which are the multiple mobile devices 251. Each of the mobile devices 251 in the region captures the sound data and calculates the local properties of the received sound (i.e., intensity, decibel).

The sound data that is captured is then transmitted to a remote cognitive system (e.g., computer 201) for analysis. The sound data includes a sound file (a digital recording of the sound from each of the mobile devices 251); an intensity descriptor (how "loud" the sound is at each of the mobile devices 251), which can be described in decibels; a direction descriptor (the location of the source of the sound relative to each of the mobile devices 251); a geophysical location of each of the mobile devices 251 when the sound was captured (e.g., using the positioning sensor 153 depicted in FIG. 1); and/or a date and time stamp (generated by an on-board clock/calendar within each of the mobile devices 251).

Step 2: Calculate Sound Source Origin

The participating mobile devices collaborate with each other based on their proximity to the sound source. The implementation of how to calculate the possible source origin can be done using a collaborative model from mobile devices, or receiving and performing analysis at the remote cognitive system. That is, the analysis of the sound data can be performed locally by one or more of the mobile devices 251 shown in FIG. 2, or this analysis can be performed by computer 201 on sound data (audio file, time stamp, location stamped, etc.) received from one or more of the mobile devices 251.

The mobile device(s) 251 and/or computer 201 calculate the possible source location of the received sound based on relative positions of the mobile devices using algorithms such as those that use the inverse square law of sound, which describes changes in sound intensity based on the distance from the detecting device (one or more of the mobile devices 251) and the sound source 200. This intensity and distance can be expressed as:

$$I = Lw/4 \pi r^2$$

where Lw=sound power (W), π=3.14, and r=radius or distance from the sound source (m).

In order to determine the location of the sound source, the system will:
1) Determine the intensity and decibel level for captured sound of each mobile device;
2) Use an inverse square law to determine the distance from the sound capturing device to the sound source based on the intensity of the captured sound; and
3) In cases where there are not enough data points to determine the sound origin accurately, data points of distance estimates will be used to estimate the location of the sound source.

Step 3: Analysis of Historical Sound Data

The system then performs an analysis of historical sound data gathered on the remote server (e.g., computer 201 shown in FIG. 2) to categorize sounds, look for patterns and correlate with other events and occurrences.

For example, assume that a user is interested in hearing the call of a mourning dove. In this example, the remote server (e.g., computer 201) will predict when and where a user and/or mobile device 251 is most likely (or best able) to hear the sound of a mourning dove's call in the future. To do so, the system first categorizes the type of sound (i.e., bird calls, specifically mourning dove bird calls). The system then correlates the captured sound with other events. This can be dynamic learning or static mapping defined in a table. For example, in the case of monitoring the call of mourning doves, the sound of mourning dove calls may be associated with ornithologists who like to hear bird calls. The system analyzes historical occurrences of the mourning dove call (using past data collected by the mobile devices 251) to determine patterns for future occurrences. For example, based on previous occurrences of mourning dove calls, the most likely occurrence of future mourning dove calls may be in a certain park at a certain time of day.

In one or more embodiments of the present invention, the system analyzes historical occurrences of sounds to identify external factors that influence patterns for future occurrence. For example, weather may influence when a sound can be heard. Combining predicted upcoming weather ("it is going to rain tomorrow") with predicted best time/location to hear sound (mourning doves are quiet when it rains) may predict that "tomorrow" may not be a good time to listen for mourning doves.

In one or more embodiments of the present invention, the system analyzes other data sources to find a source of a particular sound. For example, an image analysis of pictures on social media may show a flock of mourning doves in a certain park. Analyzing photograph time stamps indicate the birds are most prominently found in this park at 6-8 am each day.

Thus, the analysis in Step 3 generates a prediction of a sound occurrence (such as the sound of a mourning dove). The prediction contains the following attributes:
1) Location—geolocation of where the predicted sound can be heard (for example, a certain park);
2) Time—time frame of when the predicted sound can be heard (for example 6-8 a.m. daily); and
3) Confidence level—rating based upon the strength of the prediction (for example 70% confidence level).

Figure 2:
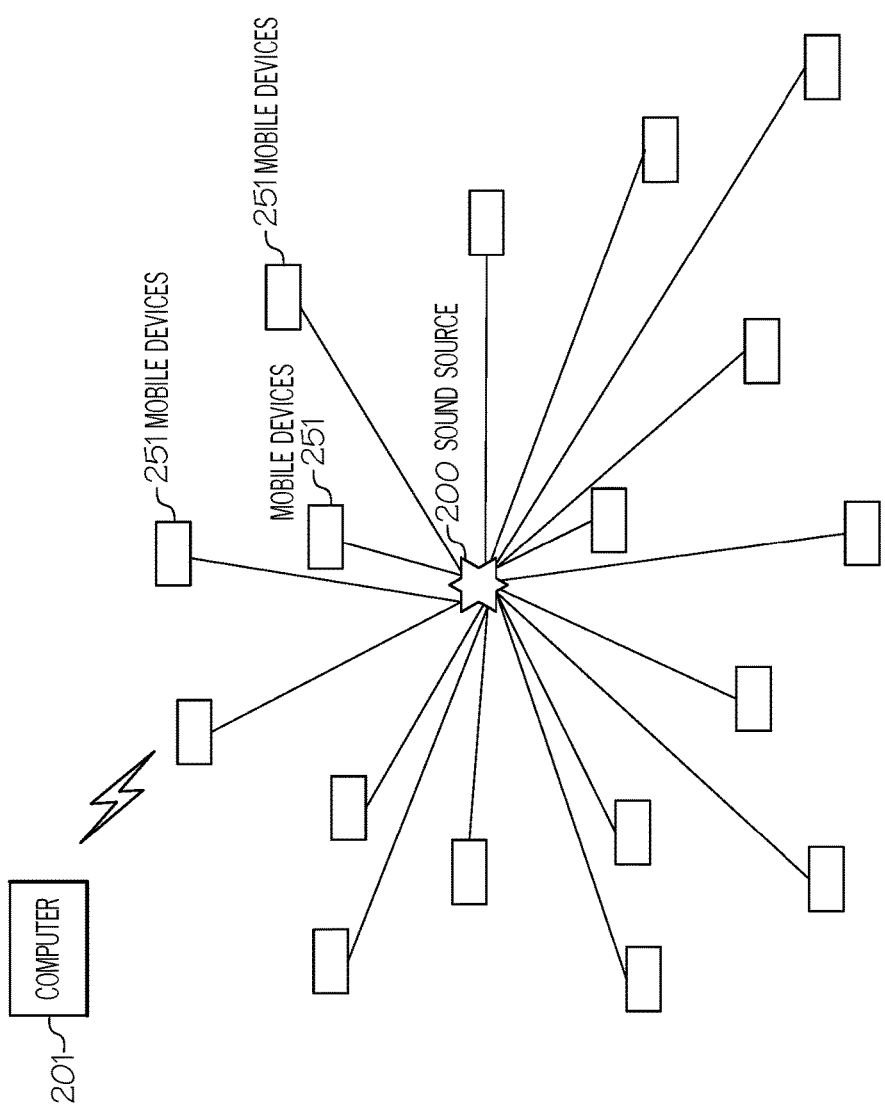
FIG. 2 illustrates a group of mobile devices used to crowdsource capturing a sound.
Figure 3:
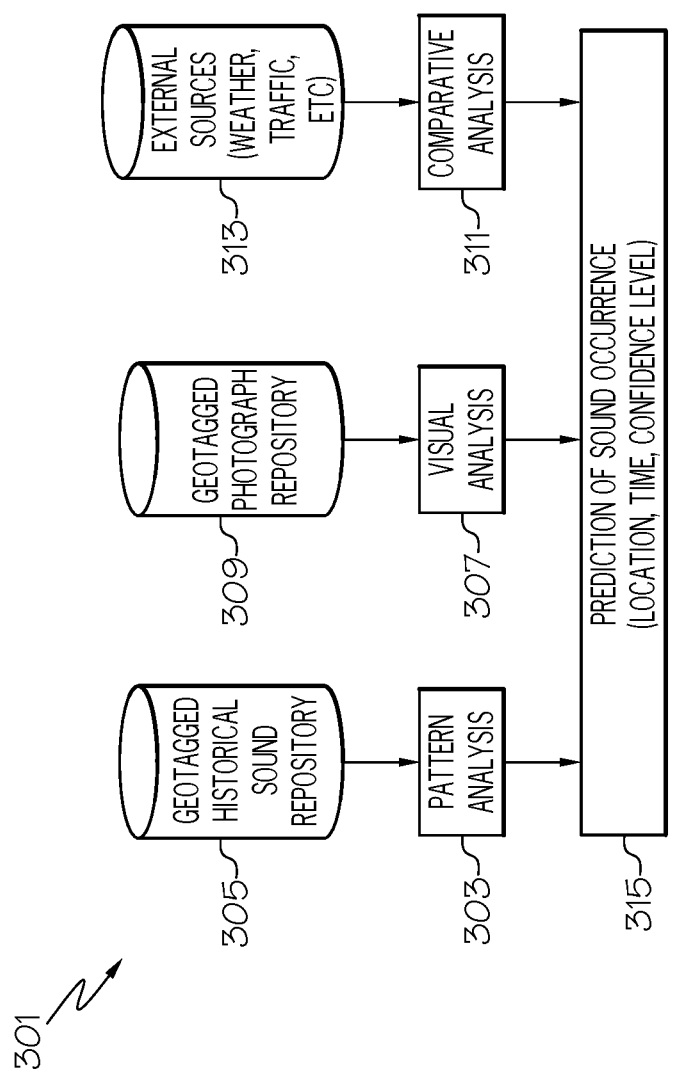
FIG. 3 depicts systems and logic used to predict a sound occurrence/reoccurrence.

The analytical process 301, which executes within the computer 201 and/or one or more of the mobile devices 251 shown in FIG. 2), to generate sound-based predictions is shown in FIG. 3.

Pattern analysis 303—Each time a sound is recognized (by comparison to audio files stored in a geotagged historical sound repository 305) and plotted onto an electronic map (see FIG. 4), that occurrence is tagged with the location and timing of the sound and stored in geotagged historical sound repository 305. Using a pattern analysis 303, the geotagged historical sound repository 305 is mined for historical trends and projects these trends into the future. For example, the system may see a pattern emerging such that in the winter months, the mourning dove can always be heard in a certain park between 6-8 a.m.

Visual analysis 307—By correlating a sound with the visual source of the captured sound, the present system utilizes a visual analysis 307 to determine current and historical trends for the source of a sound. For example, the system can tag the sound of the mourning dove to pictures (e.g., retrieved from a webpage, a crowdsourced image database, the camera 123 shown in FIG. 1) of the mourning dove. The system will then perform a visual search for occurrences for the mourning dove. This visual search can use any repository with geotagged and dated pictures (pictures that have a location and time associated with them), such as the geotagged photograph repository 309 depicted in FIG. 3. Such repositories include, but are not limited to:
1) Local picture repositories—such as pictures stored on a user's phone;
2) Online picture repositories—such as public photos found on the World Wide Web;
3) Social network repositories—such as pictures posted on social media websites.

Analysis of such repositories provides the system with an additional source of historical data for when a given sound occurred (for example a clustering of mourning doves pictured in a certain park indicates the sound of the mourning dove can also be found at this location). This historical data can be factored into the pattern analysis processing described above.

Comparative analysis 311—External factors may influence when and where a sound can be heard. For example, cold or wet weather may affect an occurrence of when the mourning dove can be heard. Factors such as heavy traffic may influence the noises generated in an area. These patterns can be recognized through the comparative analysis 311, where an external source (such as weather, traffic, etc. found in an external sources database 313) is compared to historical records (what the weather was like when a sound occurrence was recorded). Results of this analysis can be projected into the future. For example, if rain is predicted the next day, then the system will consider the impact of this on the likelihood of a given sound also being heard on the next day.

Step 4: Plot Location of Sound on Electronic Map

Figure 4:
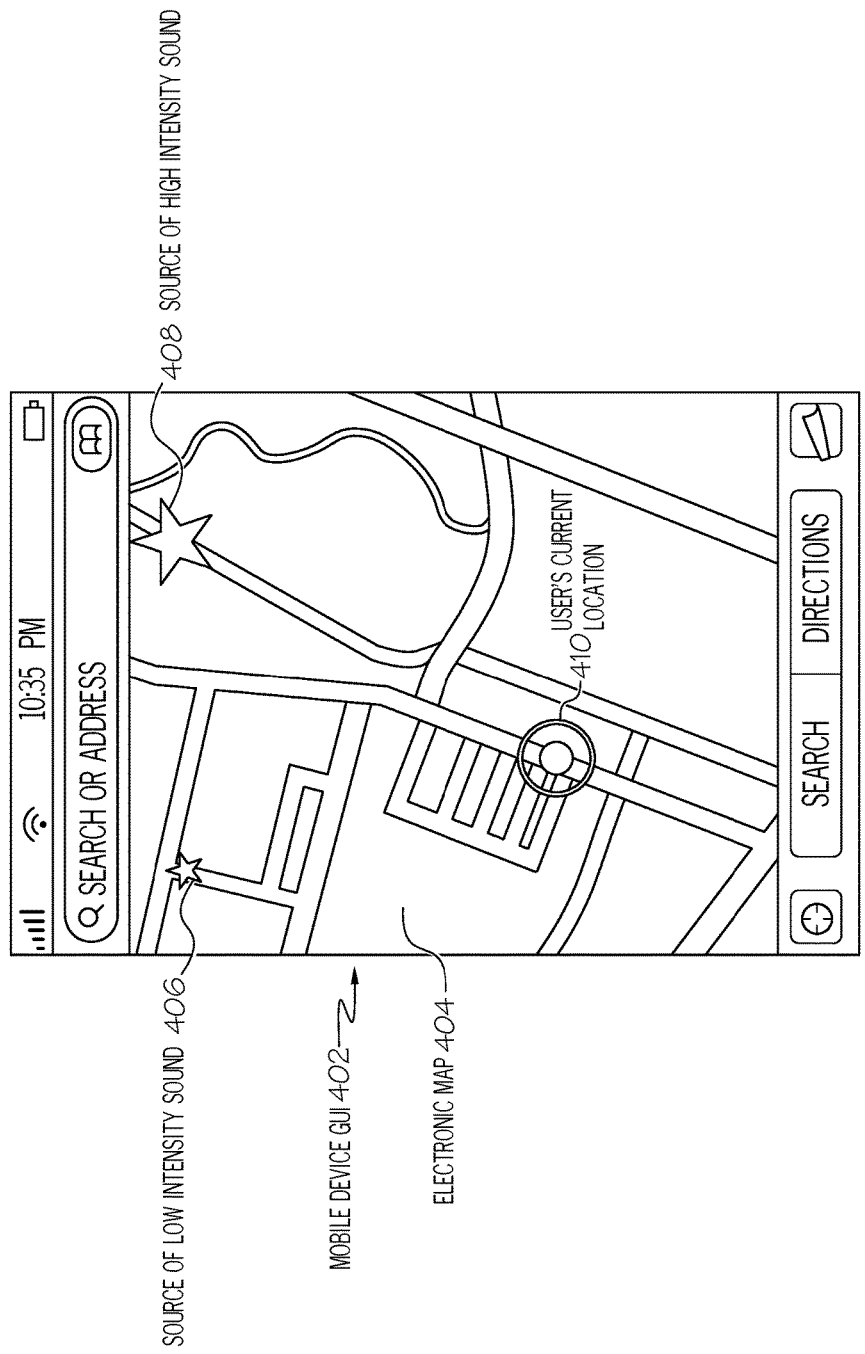
FIG. 4 illustrates an exemplary graphical user interface (GUI) on a mobile device used to identify various sound sources.

As shown in FIG. 4, a graphical user interface (GUI) 402 on a mobile device allows a user to visualize the possible sound source locations of sound on an electronic map 404. Based on the collaborative data analysis described above, the remote server will identify the possible sound source location and direction of sound and will show the location in the electronic map 404. In one or more embodiments of the present invention, multiple sound source locations may be depicted, including those of low intensity sound (source of low intensity sound 406) and high intensity sound (source of high intensity sound 408) and the users current location 410.

The system described herein uses a knowledgebase to find the location of sound by identifying the type of sound, and then gathering information from various mobile devices to calculate the possible location of the sound. If enough mobile devices are not available to collect the data, then the system will use a historical knowledge database to calculate an approximate location of the sound.

Figure 5:
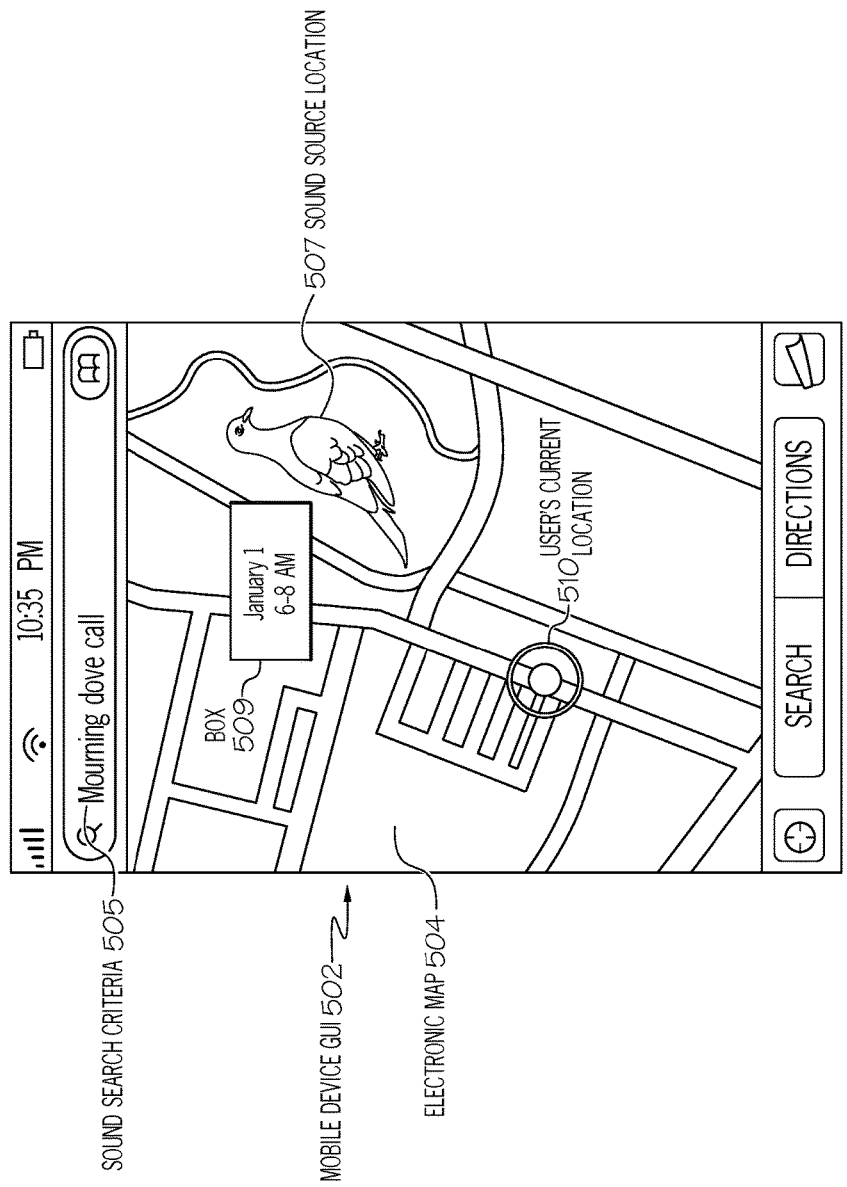
FIG. 5 illustrates a GUI on a mobile device used to locate a particular predicted sound.

Step 5: Search the Electronic Map for the Sound in Order to Predict Events or Occurrences FIG. 5 depicts a mobile device GUI 502 that can allow a user to perform a sound search using a particular sound search criteria 505, which is entered into a field in the mobile device GUI 502 as shown in FIG. 5. In the example shown in FIG. 5, the system (e.g., the mobile device on which the mobile device GUI 502 is running on a remote system such as computer 201 shown in FIG. 2) will show historical information as well as real time information with visually distinguishing marks. For example, at the depicted sound source location 507, an image of a mourning dove is shown, indicating that this position on the electronic map 504 is a likely place to see/hear mourning doves, particularly at a certain time of day and/or date, as shown in box 509.

Thus, in the example depicted in FIG. 5, the user wants to know the optimal location and time and date to hear the bird song of a mourning dove. The user first enters "mourning dove call" in the sound search criteria 505 box. The historical data analysis described above has already been performed to categorize sounds, identify patterns, and correlate events and occurrences, thus allowing the system to return and display the optimal location with optimal times on the electronic map 504.

Figure 6:
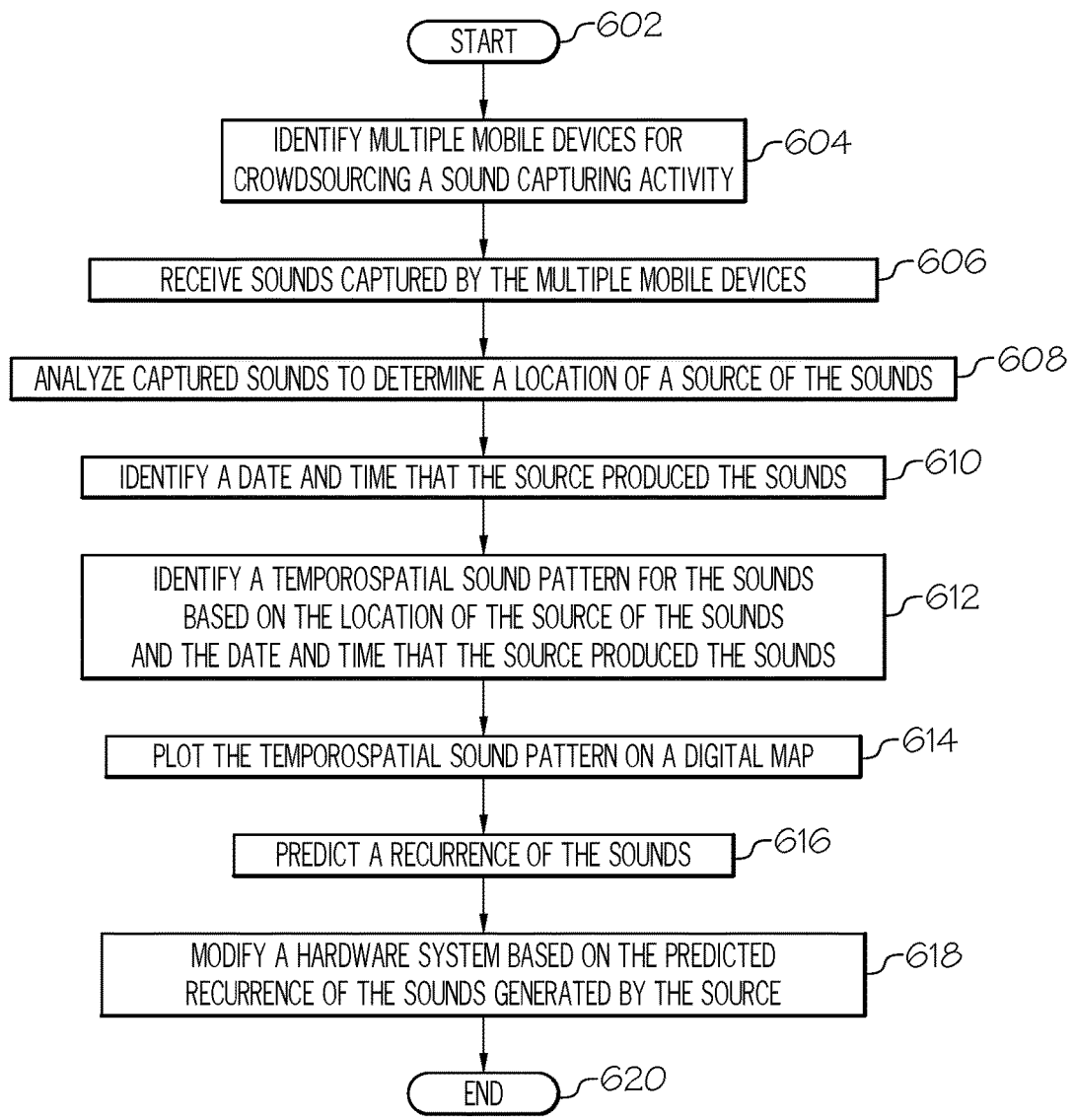
FIG. 6 is a high level flow chart of one or more steps performed by one or more processors and/or other hardware devices to capture sounds and their use in accordance with one or more embodiments of the present invention.

With referenced now to FIG. 6, a high level flow chart of one or more steps performed by one or more processors and/or other hardware devices to capture sounds and the use thereof in accordance with one or more embodiments of the present invention is presented.

After initiator block 602, one or more processors (e.g., within computer 201 shown in FIG. 2) identify multiple mobile devices (e.g., mobile devices 251) for crowdsourcing a sound capturing activity. That is, the mobile devices 251 work collectively to capture multiple copies of a particular sound, including multiple sound captures that can be used to triangulate the location of a source of the particular sound.

As described in block 606, the processor(s) receive sounds that are captured (e.g., by the microphone 117 shown in FIG. 1 when incorporated into the architecture of each of the mobile devices).

As described in block 608, the processor(s) analyze the captured sounds to determine a location of a source (i.e., a producer) of the sounds. The producer of the sounds may be biologic (e.g., a bird, a group of persons, etc.) or non-biologic (e.g., machinery, traffic, etc.) in various embodiments of the present invention.

As described in block 610, the processor(s) identify a date and time that the source produced the sounds (e.g., using a time stamp generated by the mobile device that captured the sound).

As described in block 612, the processor(s) identify a temporospatial sound pattern for the sounds based on the location of the source of the sounds and the date and time that the source produced the sounds.

As described in block 614, the processor(s) plot the temporospatial sound pattern on a digital map (as depicted in FIG. 4 and/or FIG. 5). As described herein, the digital map depicts the location of the source of the sounds while the source produced the sounds. That is, the digital map shows the location of an entity while it produced the particular sound(s).

As described in block 616, the processor(s) predict a recurrence of the sounds generated by the source based on the temporospatial sound pattern plotted on the digital map. That is and as described herein, the past record of sounds from certain locations is used to predict when the same sound (or type of sound) will again be generated.

As described in block 618, the processor(s) then modify a hardware system based on the predicted recurrence of the sounds generated by the source.

For example, assume that the hardware system is an association of the multiple mobile devices. In this embodiment, modifying the hardware system selectively activates and deactivates mobile devices from the multiple mobile devices based on the predicted recurrence of the sounds generated by the source. That is, if the system predicts a time, date, and location that a particular sound will reoccur, then mobile devices that are not in that area will have their microphones and sound file transmitters turned off, in order to reduce the amount of power and transmission bandwidth being consumed by these mobile devices (e.g., cellular phones) when monitoring for a recurrence of that particular sound.

In another example, the hardware system is a computer system (e.g., computer 201 shown in FIG. 1) that monitors the multiple mobile devices. In this embodiment, modifying the hardware system (computer 201) selectively filters out captured sound signals from the multiple mobile devices based on the predicted recurrence of the sounds generated by the source. That is, even though all of the mobile devices 251 shown in FIG. 1 are capturing sounds and streaming audio files, the computer 201 will accept only those streams coming from mobile devices 251 that are within the predicted area from which the particular type of sound is predicted to be produced in the future.

The flow chart in FIG. 6 ends at terminator block 620.

In an embodiment of the present invention, the processor(s) predict an event other than a recurrence of the sounds based on the temporospatial sound pattern plotted on the digital map. For example, assume that the system has predicted, based on previous sound patterns captured by the mobile devices 251 shown in FIG. 2, that the sounds of heavy traffic will occur on a particular freeway the following morning between 6-8 a.m. Based on the predicted sounds of heavy traffic, the system will also predict that there will be multiple accidents at this location and time period, caused by the heavy traffic. However, the event (multiple accidents) is not actually caused by the sounds, but rather by the traffic that generated the sounds.

In another embodiment, however, the sounds themselves are predicted to cause the event. For example, assume that the sounds are the sounds of explosions caused by a demolition operation. When such explosions occur, the system will predict that the sounds themselves will cause nearby windows to break. Thus, the predicted sounds of explosions are predicted to directly cause the breakage of nearby windows.

In one or more embodiments of the present invention, analyzing the captured sounds (from the mobile devices) determines the location of the source of the captured sounds. That is, each of the mobile devices may detect a particular sound from a single source at a different time, due to the speed at which sound waves travel through the air. That is, some devices may experience a delay between the time the sound originates and the time the sound is captured by a mobile device, due to the distances between the mobile devices and the source of the sound. A sound analysis of the locations of the multiple mobile devices and the differences in times that the mobile devices receive a particular sound (as indicated by a time stamp generated by each of the mobile devices) is then used to triangulate the location of the source of the sound. In one embodiment, an analysis of the captured sounds may correct for the phenomenon of acoustic shadow, in which one or more mobile devices may not register any sound, due to topography or other factors blocking a sound that would normally be captured. In this embodiment, the present invention overcomes acoustic shadow by utilizing the captured sounds from other mobile devices (i.e., mobile devices within an unimpeded area around the source of the captured sounds).

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
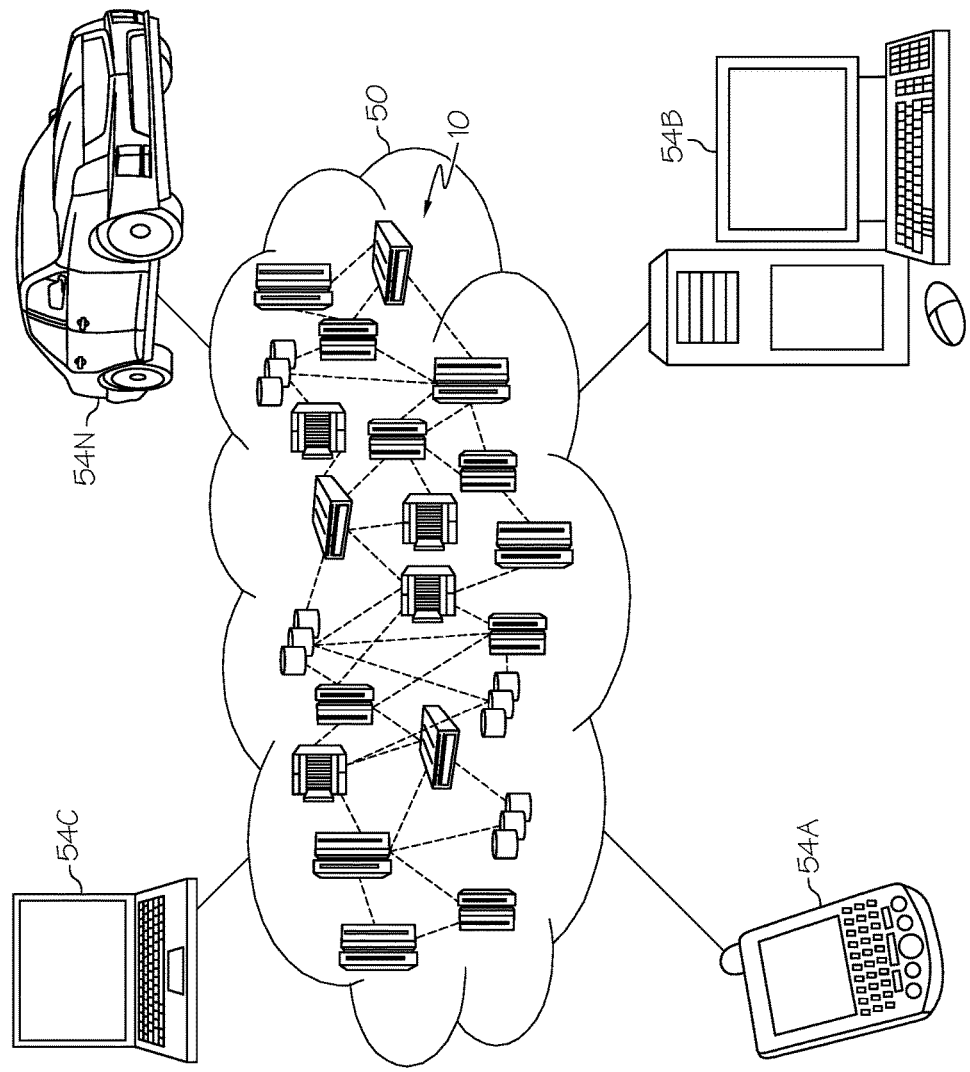
FIG. 7 depicts a cloud computing environment according to an embodiment of the present invention.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
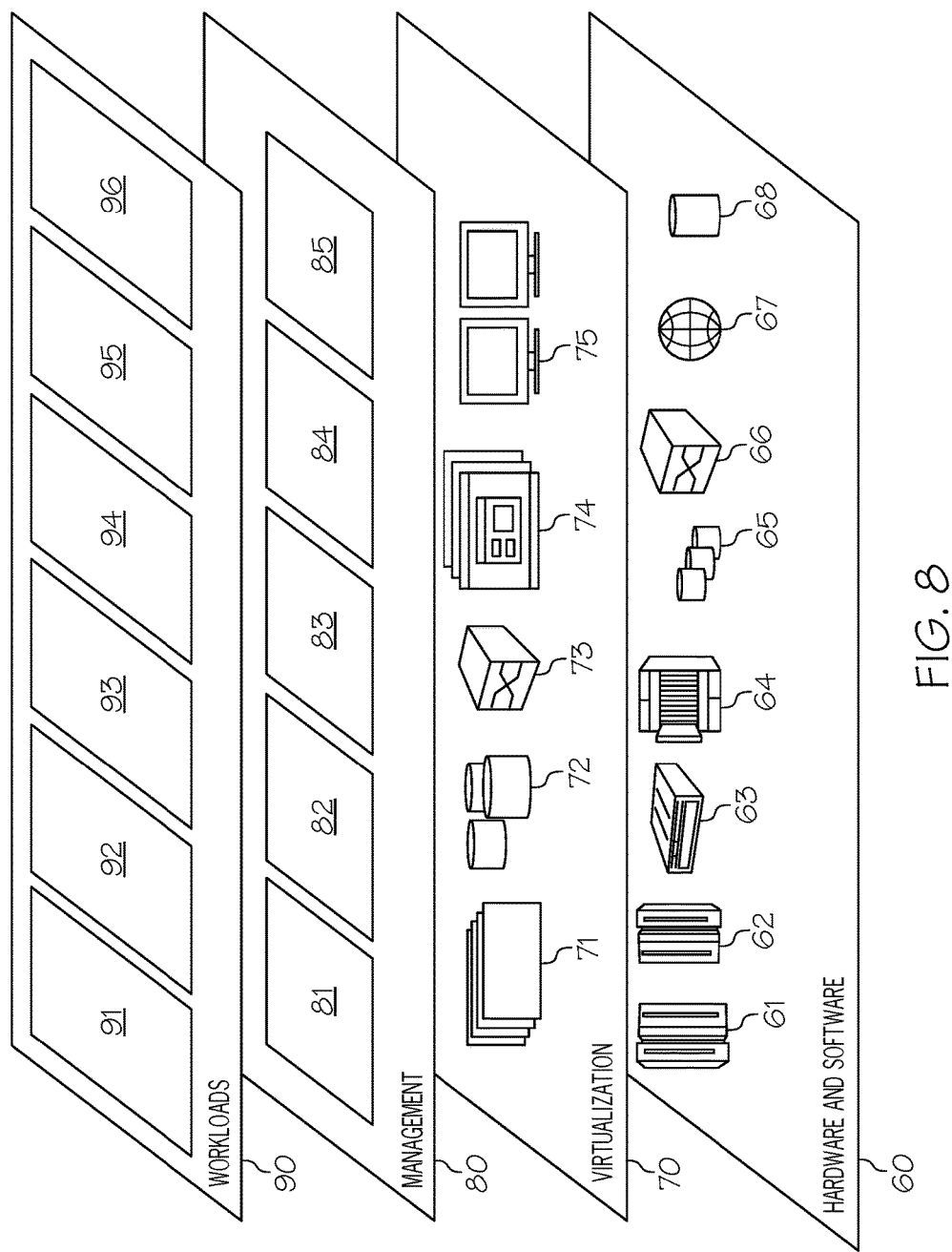
FIG. 8 depicts abstraction model layers of a cloud computing environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sound capture, event prediction, and prediction utilization processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
   identifying, by one or more processors, multiple mobile devices for crowdsourcing a sound capturing activity;
   receiving, by one or more processors, sounds captured by the multiple mobile devices;
   analyzing, by one or more processors, captured sounds to determine a location of a source of the sounds;
   identifying, by one or more processors, a date and time that the source produced the sounds;
   identifying, by one or more processors, a temporospatial sound pattern for the sounds based on the location of the source of the sounds and the date and time that the source produced the sounds;
   plotting, by one or more processors, the temporospatial sound pattern on a digital map, wherein the digital map depicts the location of the source of the sounds while the source produced the sounds;
   predicting, by one or more processors, a recurrence of the sounds generated by the source based on the temporospatial sound pattern plotted on the digital map; and
   modifying, by one or more processors, a hardware system based on the predicted recurrence of the sounds produced by the source.

2. The method of claim 1, wherein the hardware system is an association of the multiple mobile devices, and wherein said modifying the hardware system selectively activates and deactivates mobile devices from the multiple mobile devices based on the predicted recurrence of the sounds produced by the source.

3. The method of claim 1, wherein the hardware system is a computer system that monitors the multiple mobile devices, and wherein said modifying the hardware system selectively filters out captured sound signals from the multiple mobile devices based on the predicted recurrence of the sounds produced by the source.

4. The method of claim 1, further comprising:
   predicting, by one or more processors, an event other than a recurrence of the sounds based on the temporospatial sound pattern plotted on the digital map.

5. The method of claim 4, wherein the event is caused by the sounds.

6. The method of claim 1, wherein the multiple mobile devices are cellular phones.

7. The method of claim 1, wherein said analyzing of the captured sounds determines the location of the source of the captured sounds by a sound analysis.

8. A computer program product comprising one or more computer readable storage mediums, and program instructions stored on at least one of the one or more storage mediums, the stored program instructions comprising:
   program instructions to identify multiple mobile devices for crowdsourcing a sound capturing activity;
   program instructions to receive sounds captured by the multiple mobile devices;
   program instructions to analyze captured sounds to determine a location of a source of the sounds;
   program instructions to identify a date and time that the source produced the sounds;
   program instructions to identify a temporospatial sound pattern for the sounds based on the location of the source of the sounds and the date and time that the source produced the sounds;
   program instructions to plot the temporospatial sound pattern on a digital map, wherein the digital map depicts the location of the source of the sounds while the source produced the sounds;
   program instructions to predict a recurrence of the sounds generated by the source based on the temporospatial sound pattern plotted on the digital map; and
   program instructions to modify a hardware system based on the predicted recurrence of the sounds produced by the source.

9. The computer program product of claim 8, wherein the hardware system is an association of the multiple mobile devices, and wherein said modifying the hardware system selectively activates and deactivates mobile device from the multiple mobile devices based on the predicted recurrence of the sounds produced by the source.

10. The computer program product of claim 8, wherein the hardware system is a computer system that monitors the multiple mobile devices, and wherein said modifying the hardware system selectively filters out captured sound signals from the multiple mobile devices based on the predicted recurrence of the sounds produced by the source.

11. The computer program product of claim 8, further comprising:
    program instructions to predict an event other than a recurrence of the sounds based on the temporospatial sound pattern plotted on the digital map.

12. The computer program product of claim 11, wherein the event is caused by the sounds.

13. The computer program product of claim 8, wherein the multiple mobile devices are cellular phones.

14. The computer program product of claim 8, wherein said analyzing of the captured sounds determines the location of the source of the captured sounds by a sound analysis.

15. A computer system comprising one or more processors, one or more computer readable memories, and one or more computer readable storage mediums, and program instructions stored on at least one of the one or more storage mediums for execution by at least one of the one or more processors via at least one of the one or more memories, the stored program instructions comprising:

program instructions to identify multiple mobile devices for crowdsourcing a sound capturing activity;

program instructions to receive sounds captured by the multiple mobile devices;

program instructions to analyze captured sounds to determine a location of a source of the sounds;

program instructions to identify a date and time that the source produced the sounds;

program instructions to identify a temporospatial sound pattern for the sounds based on the location of the source of the sounds and the date and time that the source produced the sounds;

program instructions to plot the temporospatial sound pattern on a digital map, wherein the digital map depicts the location of the source of the sounds while the source produced the sounds;

program instructions to predict a recurrence of the sounds generated by the source based on the temporospatial sound pattern plotted on the digital map; and program instructions to modify a hardware system based on the predicted recurrence of the sounds produced by the source.

16. The computer system of claim 15, wherein the hardware system is an association of the multiple mobile devices, and wherein said modifying the hardware system selectively activates and deactivates mobile device from the multiple mobile devices based on the predicted recurrence of the sounds produced by the source.

17. The computer system of claim 15, wherein the hardware system is a computer system that monitors the multiple mobile devices, and wherein said modifying the hardware system selectively filters out captured sound signals from the multiple mobile devices based on the predicted recurrence of the sounds produced by the source.

18. The computer system of claim 15, further comprising:

program instructions to predict an event other than a recurrence of the sounds based on the temporospatial sound pattern plotted on the digital map, wherein the event is caused by the sounds.

19. The computer system of claim 15, wherein the multiple mobile devices are cellular phones.

20. The computer system of claim 15, wherein said analyzing of the captured sounds determines the location of the source of the captured sounds by a sound analysis.

* * * * *